(12) United States Patent
Müller-Wilke et al.

(10) Patent No.: US 8,735,485 B2
(45) Date of Patent: May 27, 2014

(54) RUBBER MIXTURE HAVING IMPROVED FATIGUE STRENGTH

(75) Inventors: Thomas Müller-Wilke, Lauenhagen (DE); Mario R. Conde, Rio de Janeiro (BR); Steffi Meissner, Rodenberg (DE)

(73) Assignee: Continential Reifen Deutschland GmbH, Hannover (DE)

( * ) Notice: Subject to any disclaimer, the term of this patent is extended or adjusted under 35 U.S.C. 154(b) by 254 days.

(21) Appl. No.: 13/074,931

(22) Filed: Mar. 29, 2011

(65) Prior Publication Data

US 2011/0190417 A1 Aug. 4, 2011

Related U.S. Application Data

(63) Continuation of application No. PCT/EP2009/061238, filed on Sep. 1, 2009.

(30) Foreign Application Priority Data

Sep. 29, 2008 (DE) .......... 10 2008 049 312
Jul. 23, 2009 (DE) .......... 10 2009 026 229

(51) Int. Cl.
*C08K 3/34* (2006.01)

(52) U.S. Cl.
USPC ........... 524/445; 524/442; 524/444; 524/447; 523/156; 152/155

(58) Field of Classification Search
USPC ................................. 524/445, 447
See application file for complete search history.

(56) References Cited

U.S. PATENT DOCUMENTS

| | | | |
|---|---|---|---|
| 2,531,396 A | 11/1950 | Carter et al. | |
| 4,059,558 A * | 11/1977 | Golombeck et al. | .......... 524/493 |
| 4,754,793 A | 7/1988 | Mohammed | |
| 6,585,822 B2 * | 7/2003 | Berube et al. | .............. 428/32.34 |
| 6,635,700 B2 | 10/2003 | Cruse et al. | |
| 7,019,063 B2 | 3/2006 | Wada et al. | |
| 7,134,468 B2 | 11/2006 | Sandstrom | |
| 7,414,094 B2 | 8/2008 | Miyazaki | |
| 7,491,765 B2 | 2/2009 | Krueger | |
| 7,531,588 B2 | 5/2009 | Weller et al. | |
| 2006/0161015 A1 | 7/2006 | Klockmann et al. | |
| 2006/0270775 A1 * | 11/2006 | Miyazaki | ........................ 524/449 |
| 2008/0097021 A1 * | 4/2008 | Krueger | ........................ 524/451 |
| 2008/0125537 A1 | 5/2008 | Kleffmann | |
| 2008/0146719 A1 * | 6/2008 | Yang et al. | ..................... 524/445 |

FOREIGN PATENT DOCUMENTS

| | | |
|---|---|---|
| DE | 100 58 297 A1 | 7/2002 |
| DE | 100 59 287 A1 | 7/2002 |
| EP | 0 178 079 A1 | 4/1986 |
| JP | 2007191510 A * | 8/2007 |
| WO | WO 99/09036 A1 | 2/1999 |
| WO | WO2005/017013 A1 | 2/2005 |
| WO | WO 2007014829 A1 * | 2/2007 |

OTHER PUBLICATIONS

KaMin Performance Minerals, "Polyfil DL Water Washed Kaolin Clay", Jan. 2009.*
Ricky Magee, "STSA-Life without CTAB", Columbian Chemicals Company, Apr. 2004.*
Machine translation of JP 2007191510 A, Aug. 2007.*
Weaver et al. "The Chemistry of Clay Minerals", Elsevier Scientific Publishing, 1975, p. 131.*
Perng et al. "Application of sericite to LWC coatings", Coating Peer-Reviewed, Jun. 2008.*
Sudo et al. "Clays and Clay Minerals of Japan", Elsevier Scientific Publishing, 1978, p. 132.*
Matthes, Siegfried, Mineralogie, Springer-Verlag, 3rd edition, 1990, pp. 128 to 137.

* cited by examiner

*Primary Examiner* — Ling Choi
*Assistant Examiner* — Wenwen Cai
(74) *Attorney, Agent, or Firm* — Walter Ottesen P.A.

(57) ABSTRACT

The invention relates to a rubber mixture, in particular for pneumatic vehicle tires, more particularly for the inner liner of a pneumatic vehicle tire, seat belts, belts and hoses. The rubber mixture is characterized by the following composition: 30 to 100 phr of at least one halobutyl rubber, 0 to 70 phr of at least one other diene rubber, 5 to 100 phr of at least one dry mixture compound containing at least 25% of at least one delaminated aluminohydrosilicate modification, the delaminated aluminohydrosilicate modification having a two-layer grid, 10 to 100 phr of at least one carbon black with an STSA surface as defined according to ASTM-D 6556 of from 10 to 60 $m^2/g$ and a DBP number defined according to ASTM-D 2414 of from 50 to 160 mL/100g, 3 to 20 phr of at least one mineral-oil softener, and other additives.

49 Claims, No Drawings

RUBBER MIXTURE HAVING IMPROVED FATIGUE STRENGTH

CROSS REFERENCE TO RELATED APPLICATIONS

This application is a continuation application of international patent application PCT/EP 2009/061238, filed Sep. 1, 2009, designating the United States and claiming priority from German applications 10 2008 049 312.0 and 10 2009 026 229.6, filed Sep. 29, 2008 and Jul. 23, 2009, respectively, and the entire content of the above applications is incorporated herein by reference.

FIELD OF THE INVENTION

The invention relates to a rubber mixture, in particular for pneumatic tires, and in turn in particular for the inner liner of a pneumatic tire, or for belts, drive belts, and hoses.

BACKGROUND OF THE INVENTION

The running properties of a tire, in particular of a pneumatic tire, do not depend solely on the constitution of the rubber of the tread; the constitutions of the rubber of the individual interior components also affect the running behavior of the tire, and stringent requirements are therefore also placed on the constitution of the rubber mixture at those locations. By way of example, in tubeless pneumatic tires, an inner liner arranged radially in the interior and having maximum impermeability to air prevents air introduced into the tire from escaping, which would result in significantly adverse effect on running behavior. However, for the inner liner to remain airtight, it also has to have good resistance to cracking and to fatigue, in order that driving operations do not produce cracks that impair airtightness. Resistance to cracking, and good abrasion behavior, are also demanded by way of example from the rubber mixture of the sidewall.

A wide variety of attempts have therefore been made to improve the properties of the respective rubber mixtures via the variation of the polymer components, of the fillers, and of the other additives added. A factor that has to be taken into account here is that an improvement in one of the properties often causes impairment of another property. By way of example, an improvement in cracking resistance is generally associated with increased heat accumulation, with poorer abrasion behavior, and also frequently with poorer air permeability.

Rubbers typically used for the inner liner are chlorobutyl rubber or bromobutyl rubber, occasionally blended with natural rubber. These types of rubber have low gas permeability. A further increase in airtightness can be achieved by adding voluminous low-activity or inert fillers and/or fillers with layer structure or platelet structure, but this simultaneously impairs cracking properties and fatigue properties.

Appropriate mention should be made of the following related art publications: DE 100 58 297 A1; DE 100 59 287 B4; U.S. patent application publication 2008/0125537; EP 0 178 079 A1, U.S. Pat. No. 7,491,765; and, U.S. Pat. No. 7,019,603.

DE 100 58 297 A1 and DE 100 59 287 B4 respectively disclose the use of phyllosilicates that have been modified with alkylammonium ions. The corresponding rubber mixtures comprise at least one co-crosslinking agent and feature high elongation at break alongside good modulus and good tear-propagation resistance.

United States patent application publication 2008/0125537 describes a rubber mixture, preferably for the inner liner of pneumatic tires, which comprises from 50 to 100 phr of halobutyl rubber, from 5 to 45 phr of polyisobutylene, and from 10 to 120 phr of carbon black. U.S. patent application publication 2008/0125537 addresses the object of reduced plasticizer diffusion and good compressive and tensile properties of the vulcanisates.

EP 0 178 079 A1 discloses a rubber mixture and a process for producing a rubber mixture, where the mixture comprises natural rubber as rubber component, kaolin and metakaolin and carbon black as fillers, and a quaternary ammonium salt as coupling agent.

U.S. Pat. No. 7,491,765 describes a rubber mixture, in particular for the inner liner of a pneumatic tire, which comprises from 40 to 100 phr of halobutyl rubber, and at most 60 phr of a further rubber, and talc. U.S. Pat. No. 7,491,765 addresses the object of high airtightness and improved resistance to fatigue.

U.S. Pat. No. 7,019,603 discloses a rubber composition for an internal lining of a pneumatic tire, where the lining comprises a clay in platelet form or arranged in layers, and where the rubber layer of the internal lining must have a particular thickness.

The phr (parts per hundred parts of rubber by weight) data used in this specification are the usual quantitative data for mixing specifications in the rubber industry. The amounts added of the parts by weight of the individual substances here is always based on 100 parts by weight of the total mass of all of the rubbers present in the mixture.

SUMMARY OF THE INVENTION

One of the objects of the invention is, therefore, to provide a rubber mixture in particular for pneumatic tires, and in turn in particular for the inner liner of pneumatic tires, or for belts and drive belts, where the mixture features improved resistance to fatigue.

The object is achieved via a rubber mixture with the following constitution:
- from 30 to 100 phr of at least one halobutyl rubber,
- from 0 to 70 phr of at least one further diene rubber,
- from 5 to 100 phr of a dry-mix compound which comprises at least 25% of at least one delaminated form of aluminohydrosilicate, where the delaminated form of aluminohydrosilicate has a two-layer lattice,
- from 10 to 100 phr of at least one carbon black with an STSA surface area to ASTM D6556 of from 10 to 60 $m^2/g$ and with a dibutyl phthalate (DBP) number to ASTM D2414 of from 50 to 160 mL/100 g,
- from 3 to 20 phr of at least one mineral-oil plasticizer, and further additives.

Surprisingly, it has been found that a rubber mixture with the constitution described above can improve resistance to fatigue while airtightness remains at a similar level. It is thus possible to decouple these conflicting objectives. As mentioned above, this applies in particular to the inner liner of a pneumatic tire.

The above effect could not be expected, since mixing to incorporate fillers in the form of platelets, for example, talc, is generally attended by a marked impairment of the resistance of the vulcanisates to cracking, and therefore reduced resistance to fatigue.

The rubber mixture of the invention is also used in the development of mixtures for drive belts and for other belts, in particular for conveyor belts, and for hoses. The non-load-bearing side of conveyor belts is in particular subject to severe mechanical stresses during daily use, for example, during deflection at drive drums, deflector drums, and/or tensioning drums, when it has to withstand the tensile forces arising. Here again, resistance to fatigue together with unaltered other viscoelastic properties, for example, rebound resilience, are therefore factors of particularly great importance for ensuring long lifetime.

For hoses, a property generally of very great interest is freedom from leaks with good resistance to fatigue, and in the case of air-charge hoses particularly airtightness together with very low susceptibility to cracking.

Another object of the invention is to provide a pneumatic tire which features improved resistance to fatigue.

The object is achieved in that at least one interior component of the pneumatic tire is composed of a rubber mixture which has the following constitution:
from 30 to 100 phr of at least one halobutyl rubber,
from 0 to 70 phr of at least one further diene rubber,
from 5 to 100 phr of a dry-mix compound which comprises at least 25% of at least one delaminated form of aluminohydrosilicate, where the delaminated form of aluminohydrosilicate has a two-layer lattice,
from 10 to 100 phr of at least one carbon black with an STSA surface area to ASTM D6556 of from 10 to 60 $m^2/g$ and with a DBP number to ASTM D2414 of from 50 to 160 mL/100 g,
from 3 to 20 phr of at least one mineral-oil plasticizer, and further additives.

The interior components are sidewall and/or inner liner and/or apex and/or belt and/or shoulder and/or belt profile and/or squeegee and/or carcass and/or bead reinforcement and/or bead cushion and/or rim strip and/or belt ply. The rubber mixtures for the components are also termed body compounds or body mixtures, as is usual in tire technology.

However, it is preferable that the component is the inner liner, since this is in essence responsible for the airtightness of a pneumatic tire.

The rubber mixture comprises from 30 to 100 phr of at least one halobutyl rubber and from 0 to 70 phr of at least one further diene rubber. In one particularly preferred embodiment, the rubber mixture comprises from 31 to 100 phr of at least one halobutyl rubber and from 0 to 69 phr of at least one further diene rubber.

The halobutyl rubber used can comprise any of the halobutyl rubbers that are known to a person skilled in the art and within the rubber industry. However, particular emphasis may be given here to chlorobutyl rubber.

The further diene rubber here is one selected from the group consisting of butyl rubber, polybutadiene rubber, styrene-butadiene copolymer, synthetic polyisoprene, natural polyisoprene, styrene-isoprene copolymer, styrene-isoprene-butadiene terpolymer, solution-polymerized styrene-butadiene rubber, and emulsion-polymerized styrene-butadiene rubber, and/or ethylene-propylene-diene rubber.

Materials in particular used in the production of technical rubber items, such as belts, drive belts, and hoses, are styrene-isoprene-butadiene terpolymer, butyl rubber, or ethylene-propylene-diene rubber.

The diene rubber used can have been functionalized. This functionalization uses hydroxy groups and/or epoxy groups and/or siloxane groups and/or amino groups and/or phthalocyanine groups and/or aminosiloxane groups and/or carboxy groups and/or further functionalization systems which can enter into chemical bonding with the pale-colored fillers used.

These functionalization systems are also known to the person skilled in the art as modification systems.

The diene rubber and/or halobutyl rubber can also be a non-functionalized rubber, the resultant situation in the rubber mixture being that all of the rubbers, some of the rubbers, or none of the rubbers has/have been functionalized.

However, another possibility is that still further rubbers which have not been mentioned hitherto are incorporated by mixing them into the rubber mixture.

One important constituent of the rubber mixture of the invention is carbon black, the amounts of which are specifically from 10 to 100 phr, preferably from 30 to 100 phr.

Resistance to cracking and to fatigue can be improved particularly markedly by using a carbon black with an STSA surface area to ASTM D6556 of 10 $m^2/g$, preferably 15 $m^2/g$, or up to 60 $m^2/g$, and with a DBP number to ASTM D2414 of 50 mL/100 g, preferably 55 mL/100 g, or up to 160 mL/100 g.

The STSA value (statistical thickness surface area), based on nitrogen adsorption measurement, provides the surface area without porosity effects, whereas the dibutyl phthalate (DBP) number to ASTM D2414 determines the specific absorption volume of a carbon black or of a pale-colored filler by using dibutyl phthalate.

The use of this type of carbon black in the rubber mixture, in particular for pneumatic tires, ensures an ideal compromise covering abrasion resistance and heat accumulation, both of which affect the resistance of the rubber mixture to fatigue. It is preferable here to use only one type of carbon black in the respective rubber mixture, but it is also possible to incorporate various types of carbon black by mixing into the rubber mixture.

However, it is fully possible that at least one silica is also used in the rubber mixture.

If silica is used in the rubber mixture of the invention, the amounts present thereof are from 0 to 100 phr, preferably from 0 to 50 phr, and a suitable coupling agent couples it completely to the polymer matrix.

The silicas used in the tire industry are generally precipitated silicas, which in particular are characterized by their surface area. The values used for characterization here are the nitrogen surface area (BET) to DIN 66131 and DIN 66132 as a measure of the interior and exterior surface area of the filler in $m^2/q$, and the CTAB surface area to ASTM D3765 as a measure of the exterior surface area, which is often considered to be the surface area effective in a rubber, stated in $m^2/g$.

DIN 66131 here corresponds to ISO 9277:1995 and includes determination of the specific surface area of solids via gas adsorption by the Brunauer, Emmett, and Teller method, this surface area also being termed BET or BET number.

It is preferable to use silicas with a nitrogen surface area greater than or equal to 110 $m^2/g$, preferably from 115 to 300 $m^2/g$, particularly preferably from 150 to 280 $m^2/g$, and with a CTAB surface area from 100 to 260 $m^2/g$, preferably from 140 to 200 $m^2/g$.

It is moreover possible to add still further fillers known to the person skilled in the art to the rubber mixture, an example being chalk or talc.

If a coupling agent is used, in the form of silane, organosilane, or an organosilicon compound, the amount of the coupling agent is from 0 to 10 phr, preferably from 0 to 5 phr, particularly preferably from 0 to 3 phr, in particular at least 0.1 phr. Coupling agents that can be used here are any of the coupling agents known to the person skilled in the art for use in rubber mixtures. Particular mention, may be made here of mercaptosilanes and among those in particular those which feature a reduced level of volatile organic constituents, for example those found in U.S. patent application publication 2006/0161015, WO99/09036 A1, U.S. Pat. No. 6,635,700, and U.S. Pat. No. 7,531,588, by way of examples of other publications.

It is essential to the invention that the rubber mixture comprises from 5 to 100 phr, preferably from 10 to 100 phr, particularly preferably from 20 to 100 phr, very particularly preferably from 30 to 100 phr, and even more particularly preferably from 40 to 100 phr, of at least one dry-mix compound which comprises at least 25% of at least one delaminated form of aluminohydrosilicate, where the delaminated form of aluminohydrosilicate has a two-layer lattice, and where very particular preference is given here to amounts of at least one dry-mix compound which are from 50 to 100 phr and even more preference is given to amounts of from 51 to 100 phr. The percentage data here are based on the total weight of the dry-mix compound. The two-layer lattice of the delaminated form of aluminohydrosilicate is preferably a dioctahedral two-layer lattice.

The water content of the dry-mix compound is from 0 to 2%, preferably from 0 to 1%. The water content is in essence, but not exclusively, attributable to the presence of water of crystallization.

In one particularly preferred embodiment, the dry-mix compound also comprises at least 40% of a di- or trioctahedral three-layer silicate from the group of the phyllosilicates, and/or at least 10% of an amorphous quartz or of a crystalline form of quartz. The percentage data here are based on the total weight of the dry-mix compound.

In relation to the classification of the di- or trioctahedral three-layer silicates, reference may be made by way of example to Matthes, Mineralogie [Mineralogy], Springer textbook, 3rd edition, 1990, pp. 129 ff.

Particularly good resistance to fatigue is apparent when the delaminated aluminohydrosilicate has a CTAB surface area to ASTM D3765 of from 10 to 40 $m^2/g$, a BET surface area to DIN66131 and DIN66132 of from 10 to 20 $m^2/g$, an average particle size of from 5 to 15 μm, and a particle size $D_{50}$ of from 3 to 9 μm. The values were determined by laser diffraction.

The "aspect ratio" can be determined from the size and shape of the particles. It has proven advantageous for the aspect ratio, that is, the ratio of length to width of the particles (L/W), to be from 1.0 to 2.8, preferably from 1.0 to 2.0, and particularly preferably from 1.2 to 1.5. To determine the aspect ratio, the particles were measured with the aid of an automated image-analysis process using a CCD detector in the form of a Sysmex FPIA-3000 from Malvern Instruments Ltd. For further details concerning analysis of the measurements, reference may be made here to the corresponding data sheets and information provided by the abovementioned manufacturer; some of these are available on the manufacturer's home page.

The lamellarity index of the delaminated form of aluminohydrosilicate is moreover from 2 to 15, preferably from 2 to 10, particularly preferably from 2 to 5. The lamellarity index is a measure of the morphology, that is, of the degree of delamination (of the layers); for identical fineness of the delaminated form of aluminohydrosilicate (determined via laser diffraction), a higher lamellarity index reveals a higher level of structure. The lamellarity index is determined via the following formula:

Lamellarity index=(particle size from laser diffraction)−(particle size from sedimentation)

Particle Size from Sedimentation

A SediGraph 5100 particle-size-measurement device from Micromeritics Instruments, Germany was used to determine the particle size via sedimentation.

It is preferable that the delaminated form of aluminohydrosilicate involves delaminated $Al_2[(OH)_4/Si_2O_5]$.

At least one mineral-oil plasticizer is present in the rubber mixture, its amounts specifically being from 3 to 20 phr, preferably from 5 to 20 phr.

The mineral-oil plasticizer is one selected from the group consisting of DAE (Distilled Aromatic Extracts), and/or RAE (Residual Aromatic Extract), and/or TDAE (Treated Distilled Aromatic Extracts), and/or MES (Mild Extracted Solvents), and/or naphthenic oils.

In a particularly preferred embodiment, the plasticizer has a viscosity of from 40 to 100 $mm^2/s$ at 100° C., and a glass transition temperature $T_g$ from −40° C. to −30° C., of its content of aromatics while from 30 to 60% by weight. The rubber mixture can also comprise from 0 to 10 phr of at least one further additional plasticizer, preferably from 0.1 to 5 phr. The further plasticizer is one selected from the group consisting of synthetic plasticizers and/or fatty acids and/or fatty acid derivatives and/or resins and/or factices and/or low-molecular-weight polymers, known as liquid polymers, and/or vegetable oils.

The rubber mixture also comprises further additives. The term further additives includes in essence the crosslinking system (crosslinking agent, accelerator, and retarder), reinforcing agents, for example, chalk, reinforcing resins, antiozonants, antioxidants, mastication aids, and further activators. The quantitative proportion of the total amount of further additives is from 3 to 150 phr, preferably from 3 to 100 phr, and particularly preferably from 5 to 80 phr.

The term further additives also includes a compound comprising zinc ions. This is preferably amounts of from 0.1 to 10 phr of zinc oxide, preferably from 0.2 to 8 phr, particularly preferably from 0.2 to 4 phr.

It is usual to add to a rubber mixture for sulfur crosslinking, with vulcanization accelerators, zinc oxide as activator, mostly in combination with fatty acids (for example, stearic acid). The sulfur is then activated via complexing for the vulcanization process. The zinc oxide conventionally used here generally has a BET surface area of less than 10 $m^2/g$. However, what is known as nano-zinc oxide can also be used, with a BET surface area of from 10 to 60 $m^2/g$.

The vulcanization accelerator(s) has/have been selected from the group of the sulfenamide accelerators and/or thiazole accelerators and/or guanidine accelerators and/or thiuram accelerators and/or mercapto accelerators and/or dithiocarbamate accelerators and/or amine accelerators and/or thioureas and/or dithiophosphates.

The vulcanization of the rubber mixture is preferably carried out in the presence of sulfur or of sulfur donors, and some sulfur donors here can simultaneously act as vulcanization accelerators. The amounts of sulfur or of sulfur donor added to the rubber mixture in the final mixing step are those familiar to the person skilled in the art (from 0.4 to 4 phr, preferably from 1.5 to 2.5 phr in the case of sulfur).

The rubber mixture of the invention is produced by the process conventional in the rubber industry, where a parent mixture with all of the constituents other than the vulcanization system (sulfur and substances that affect vulcanization) is first produced in one or more mixing stages. The finished mixture is produced via addition of the vulcanization system in a final mixing stage. The finished mixture is further processed by way of example through an extrusion procedure, and converted to the appropriate form.

Another advantage provided by the rubber mixture of the invention is that, through the use of the dry-mix compound, the fill level in the internal mixer can be increased. This leads to increased capacity and therefore to reduced production costs.

Another object on which the invention was based was to use the rubber mixture described above for the production of pneumatic tires, in particular for the production of the tread of a tire and/or especially for the production of a body mixture of a tire and for the production of drive belts and other belts.

Another object on which the invention was based was to use the rubber mixture described above for the production of pneumatic tires, in particular for the production of the tread of a tire and/or especially for the production of a body mixture of a tire and for the production of drive belts and other belts, and of hoses.

For the use in pneumatic tires, the mixture is preferably converted to the form of a tread and applied in the known manner during the production of the green tire. However, the tire tread can also be wound in the form of a narrow strip of rubber mixture onto a green tire. The rubber mixture for the use as body mixture in tires is produced as described above for the tread. The difference lies in the shaping process after the extrusion procedure. The resultant forms of the rubber mixture of the invention for a body mixture or more than one different body mixture then serve for the construction of a green tire. For the use of the rubber mixture of the invention in drive belts and other belts, in particular in conveyor belts, the extruded mixture is converted to the appropriate form and during this process or subsequently is frequently provided with reinforcement, for example, synthetic fibers or steel cord. The result is mostly a multilayer structure, composed of one or more layers of rubber mixture, one or more layers of identical and/or different reinforcement, and one or more further layers of the same and/or another rubber mixture.

DESCRIPTION OF THE PREFERRED EMBODIMENTS OF THE INVENTION

Comparative examples and inventive examples collated in Tables 1 to 3 will now be used for further explanation of the invention. The mixtures characterized by "I" here are inventive mixtures, whereas the mixtures characterized by "C" are comparative mixtures. The tables characterized by "a" in each case show the constitution of the mixture, whereas the tables characterized by "b" show the corresponding physical properties of the rubber mixtures.

In the case of all of the mixture examples contained in the table, the quantitative data stated are parts by weight, based on 100 parts by weight of total rubber (phr).

The mixture was produced under conventional conditions in two stages in a laboratory tangential mixer. All of the mixtures were used to produce test specimens via vulcanization, and the test specimens were used to determine the properties typical for the rubber industry, from the material. The test methods used for the tests described above on test specimens were the following:

Shore A hardness at room temperature to DIN 53 505
rebound resilience at room temperature to DIN 53 512
modulus for 100% elongation at room temperature to DIN 53 504
tensile strength at room temperature to DIN 53 504
fracture energy at room temperature to DIN 53 448
air permeability to DIN 53 536 at 70° C. air temperature
Monsanto fatigue test (fatigue to failure tester) at 136% elongation and at room temperature TABLE 1a

| Constituents | Unit | C1 | C2 | I1 |
|---|---|---|---|---|
| Chlorobutyl rubber | phr | 100 | 100 | 100 |
| Carbon black A[a] | phr | 60 | — | — |
| Carbon black B[b] | phr | — | 45 | 45 |
| Mineral oil[c] | phr | 14 | 12 | 12 |
| Talc[d] | phr | — | 25 | — |
| Dry-mix compound[e] | phr | — | — | 25 |
| Resin | phr | 0.5 | 0.5 | 0.5 |
| ZnO | phr | 3 | 3 | 3 |
| Stearic acid | phr | 2 | 2 | 2 |
| Processing aid | phr | 8.2 | 8.2 | 8.2 |
| DPG, CBS, sulfur | phr | 1.8 | 1.8 | 1.8 |

[a]Carbon black A: N 660
[b]Carbon black B: Ecorax S 206, Evonik Industries AG
[c]RAE
[d]Talc, Mistron HAR, Rio Tinto Minerals
[e]Kaolin W, Erbslöh, Germany, aspect ratio: 1.35, $d_{50}$: 8.4 μm, lamellarity index: 2.3

TABLE 1b

| Properties | Unit | C1 | C2 | I1 |
|---|---|---|---|---|
| Tensile strength | MPa | 7.1 | 6.6 | 6.4 |
| Elongation at break | % | 760 | 920 | 1000 |
| 100% modulus | MPa | 0.9 | 1.0 | 0.75 |
| Hardness | Shore A | 46 | 44 | 40 |
| Rebound resilience | % | 9 | 9 | 9 |
| Permeation coefficient | m$^2$/(Pa * s) | 5.3 | 3.6 | 4.6 |
| Monsanto fatigue | kcycles | 50 | 375 | 730 |

TABLE 2a

| Constituents | Unit | C3 | C4 | I2 | I3 | C5 | C6 | I4 | I5 |
|---|---|---|---|---|---|---|---|---|---|
| Chlorobutyl rubber | phr | 100 | 100 | 100 | 100 | 100 | 100 | 100 | 100 |
| Carbon black A[a] | phr | 60 | — | — | 45 | 45 | 45 | — | 45 |
| Carbon black B[b] | phr | — | 45 | 45 | — | — | — | 45 | — |
| Mineral oil[c] | phr | 12 | 12 | 12 | 12 | 2 | 22 | 12 | 12 |
| Talc[d] | phr | — | 28 | — | — | — | — | — | — |
| Dry-mix compound A[e] | phr | — | — | 28 | 28 | 28 | 28 | 40 | 40 |
| Resin | phr | 0.5 | 0.5 | 0.5 | 0.5 | 0.5 | 0.5 | 0.5 | 0.5 |
| ZnO | phr | 3 | 3 | 3 | 3 | 3 | 3 | 3 | 3 |
| Stearic acid | phr | 2 | 2 | 2 | 2 | 2 | 2 | 2 | 2 |
| Processing aid | phr | 8.2 | 8.2 | 8.2 | 8.2 | 8.2 | 8.2 | 8.2 | 8.2 |
| DPG, MBTS, sulfur | phr | 1.8 | 1.8 | 1.8 | 1.8 | 1.8 | 1.8 | 1.8 | 1.8 |

[a]Carbon black A: N 660
[b]Carbon black B: Ecorax S 206, Evonik Industries AG
[c]RAE
[d]Talc, Mistron HAR, Rio Tinto Minerals
[e]Kaolin W, Erbslöh, Germany, aspect ratio: 1.35, $d_{50}$: 8.4 μm, lamellarity index: 2.3

TABLE 2b

| Properties | Unit | C3 | C4 | I2 | I3 | C5 | C6 | I4 | I5 |
|---|---|---|---|---|---|---|---|---|---|
| Tensile strength | MPa | 8.1 | 6.5 | 7.0 | 7.6 | 7.7 | 7.4 | 6.6 | 6.9 |
| Elongation at break | % | 887 | 851 | 975 | 910 | 779 | 1013 | 947 | 815 |
| 100% modulus | MPa | 1.1 | 1.3 | 1.0 | 1.2 | 1.6 | 0.9 | 1.1 | 1.4 |
| Hardness | Shore A | 51 | 50 | 46 | 51 | 58 | 46 | 49 | 54 |
| Rebound resistance | % | 7 | 8 | 8 | 8 | 9 | 8 | 8 | 8 |
| Permeation coefficient | $m^2/(Pa * s)$ | 5.0 | 3.5 | 3.8 | 4.3 | 3.4 | 4.6 | 3.9 | 3.4 |
| Monsanto fatigue | kcycles | 204 | 134 | 291 | 161 | 103 | 266 | 416 | 138 |

TABLE 3a

| Constituents | Unit | C7 | C8 | I6 |
|---|---|---|---|---|
| Chlorobutyl rubber | phr | 90 | 90 | 90 |
| Natural rubber | phr | 10 | 10 | 10 |
| Carbon black A[a] | phr | 50 | — | — |
| Carbon black B[b] | phr | — | 40 | 40 |
| Mineral oil[c] | phr | 10 | 12.5 | 12.5 |
| Talc[d] | phr | — | 25 | — |
| Calcium carbonate | phr | 30 | 30 | — |
| Dry-mix compound A[e] | phr | — | — | 55 |
| ZnO | phr | 3 | 3 | 3 |
| Stearic acid | phr | 1 | 1 | 1 |
| Processing aid | phr | 7.4 | 7.4 | 7.4 |
| DPG, MBTS, sulfur | phr | 1.8 | 1.8 | 1.8 |

[a]Carbon black A: N 660
[b]Carbon black B: Ecorax S 206, Evonik Industries AG
[c]RAE
[d]Talc, Mistron HAR, Rio Tinto Minerals
[e]Kaolin W, Erbslöh, Germany, aspect ratio: 1.35, $d_{50}$: 8.4 µm, lamellarity index: 2.3

TABLE 3b

| Properties | Unit | C7 | C8 | I6 |
|---|---|---|---|---|
| Tensile strength | MPa | 6.6 | 5.9 | 5.9 |
| Elongation at break | % | 699 | 691 | 734 |
| 100% modulus | MPa | 1.0 | 1.3 | 1.3 |
| Hardness | Shore A | 47 | 49 | 49 |
| Rebound resistance | % | 11 | 11 | 11 |
| Permeation coefficient | $m^2/(Pa * s)$ | 5.7 | 4.7 | 4.2 |
| Monsanto fatigue | kcycles | 126 | 73 | 140 |

It can be seen from Table 1c that through addition of talc, see C2, to a rubber mixture normally used for the inner liner, see C1, in combination with a specific type of carbon black, can improve airtightness, indicated via the permeation coefficient, with simultaneous optimization of fatigue properties, shown via the Monsanto fatigue value.

Mixture I1 of the invention likewise shows a marked improvement in airtightness in comparison with C1 and its airtightness level remains similar to that of C2. However, I1 shows an extremely significant increase in resistance to fatigue in comparison with C2, and the advantages described above for addition of a dry-mix compound A can therefore be clearly seen. These abovementioned advantages are also apparent from the experimental results of inventive examples 12 to 16 seen in relation to those of comparative examples C3 to C8, these being shown in Tables 2b and 3b.

It is understood that the foregoing description is that of the preferred embodiments of the invention and that various changes and modifications may be made thereto without departing from the spirit and scope of the invention as defined in the appended claims.

What is claimed is:

1. A rubber mixture, comprising:
   from 30 to 100 phr of at least one halobutyl rubber,
   from 0 to 70 phr of at least one additional diene rubber,
   from 51 to 100 phr of a dry-mix compound, which comprises at least 25% of at least one delaminated form of aluminohydrosilicate, where the at least one delaminated form of aluminohydrosilicate has a two-layer lattice, has an aspect ratio of from 1.0 to 2.8 and has an average particle size of 5 to 15 µm, and where the dry-mix compound has a water content of 0 to 1% by weight,
   from 10 to 100 phr of at least one carbon black with a statistical thickness (STSA) surface area to ASTM D6556 of from 10 to 60 $m^2/g$ and with a dibutyl phthalate (DBP) number to ASTM D2414 of from 50 to 160 mL/100 g,
   from 3 to 20 phr of at least one mineral-oil plasticizer, and
   additional additives.

2. The rubber mixture as claimed in claim 1, wherein the rubber mixture comprises from 31 to 100 phr of the at least one halobutyl rubber and from 0 to 69 phr of the at least one additional diene rubber.

3. The rubber mixture as claimed in claim 1, wherein the additional diene rubber is selected from the group consisting of butyl rubber, polybutadiene rubber, styrene-butadiene copolymer, synthetic polyisoprene, natural polyisoprene, styrene-isoprene copolymer, styrene-isoprene-butadiene terpolymer, solution-polymerized styrene-butadiene rubber, and emulsion-polymerized styrene-butadiene rubber.

4. The rubber mixture as claimed in claim 1, wherein the rubber mixture comprises from 30 to 100 phr of at least one carbon black with an STSA surface area to ASTM D6556 of from 10 to 60 $m^2/g$ and with a DBP number to ASTM D2414 of from 50 to 160 mL/100 g.

5. The rubber mixture as claimed in claim 1, wherein the carbon black has an STSA surface area to ASTM D6556 of from 15 to 60 $m^2/g$ and a DBP number to ASTM D2414 of from 55 to 160 mL/100 g.

6. The rubber mixture as claimed in claim 1, wherein the delaminated form of aluminohydrosilicate has a dioctahedral two-layer lattice.

7. The rubber mixture as claimed in claim 1, wherein the dry-mix compound also comprises at least 40% of a di- or trioctahedral three-layer silicate from the group of the phyllosilicates, and/or at least 10% of an amorphous quartz or of a crystalline form of quartz.

8. The rubber mixture as claimed in claim 1, wherein the delaminated form of aluminohydrosilicate has a CTAB surface area to ASTM D3765 of from 10 to 40 $m^2/g$.

9. The rubber mixture as claimed in claim 1, wherein the delaminated form of aluminohydrosilicate has a BET surface area to DIN66131 and DIN66132 of from 10 to 20 $m^2/g$.

10. The rubber mixture as claimed in claim 1, wherein the delaminated form of aluminohydrosilicate has a particle size $D_{50}$ of from 3 to 9 μm.

11. The rubber mixture as claimed in claim 1, wherein the lamellarity index of the delaminated form of aluminohydrosilicate is from 2 to 15.

12. The rubber mixture as claimed in claim 1, wherein the delaminated form of aluminohydrosilicate involves delaminated $Al_2[(OH)_4/Si_2O_5]$.

13. The rubber mixture as claimed in claim 1, wherein the rubber mixture comprises from 5 to 20 phr of at least one mineral-oil plasticizer.

14. The rubber mixture as claimed in claim 1, wherein the mineral-oil plasticizer has a viscosity of from 40 to 100 mm²/s at 100° C.

15. The rubber mixture as claimed in claim 1, wherein the mineral-oil plasticizer has a glass transition temperature $T_g$ of from −40° C. to −30° C.

16. The rubber mixture as claimed in claim 1, wherein the mineral-oil plasticizer has from 30 to 60% by weight content of aromatics.

17. The rubber mixture as claimed in claim 1, wherein the quantitative proportion of the additional additives is from 3 to 150 phr.

18. The rubber mixture as claimed in claim 17, wherein the quantitative proportion of the additional additives is from 3 to 100 phr.

19. The rubber mixture as claimed in claim 18, wherein the quantitative proportion of the additional additives is from 5 to 80 phr.

20. A method of producing a tire comprising preparing a rubber mixture as claimed in claim 1.

21. The method as claimed in claim 20 for the production of the tread of a tire.

22. The method as claimed in claim 20 for the production of a body mixture of a tire.

23. The method as claimed in claim 22 for the production of a body mixture of a tire, including sidewall, inner liner, core profile, belt, shoulder, belt profile, squeegee, carcass, bead reinforcement, bead profile, and flange profile, and/or a solid tire.

24. A method of producing a belt comprising preparing a rubber mixture as claimed in claim 1.

25. The method as claimed in claim 24 for the production of a conveyor belt.

26. The method as claimed in claim 25 for the production of the non-loadbearing side of a conveyor belt.

27. A method of producing a drive belt or of a hose comprising preparing a rubber mixture as claimed in claim 1.

28. The method as claimed in claim 27 for the production of a flat drive belt, V-shaped drive belt, V-ribbed drive belt, timing belt, air-charge hose, coolant-water hose, or motor-vehicle hose.

29. A pneumatic tire, wherein at least one inner component of the pneumatic tire is composed of a rubber mixture which has the following constitution:
from 30 to 100 phr of at least one halobutyl rubber,
from 0 to 70 phr of at least one additional diene rubber,
from 51 to 100 phr of a dry-mix compound which comprises at least 25% of at least one delaminated form of aluminohydrosilicate, where the delaminated form of aluminohydrosilicate has a two-layer lattice, has an aspect ratio of from 1.0 to 2.8 and has an average particle size of 5 to 15 μm, and where the dry-mix compound has a water content of 0 to 1% by weight,
from 10 to 100 phr of at least one carbon black with a STSA surface area to ASTM D6556 of from 10 to 60 m²/g and with a DBP number to ASTM D2414 of from 50 to 160 mL/100 g,
from 3 to 20 phr of at least one mineral-oil plasticizer, and additional additives.

30. The pneumatic tire as claimed in claim 29, wherein the component is sidewall and/or inner liner and/or core profile and/or belt and/or shoulder and/or belt profile and/or squeegee and/or carcass and/or bead reinforcement and/or bead profile and/or flange profile and/or a solid tire.

31. The pneumatic tire as claimed in claim 30, wherein the component is the inner liner of a pneumatic tire.

32. The pneumatic tire as claimed in claim 29, wherein the rubber mixture comprises from 31 to 100 phr of at least one halobutyl rubber and from 0 to 69 phr of the at least one additional diene rubber.

33. The pneumatic tire as claimed in claim 29, wherein the additional diene rubber of the rubber mixture has been selected from the group consisting of butyl rubber, polybutadiene rubber, styrene-butadiene copolymer, synthetic polyisoprene, natural polyisoprene, styrene-isoprene copolymer, styrene-isoprene-butadiene terpolymer, solution-polymerized styrene-butadiene rubber, and emulsion-polymerized styrene-butadiene rubber.

34. The pneumatic tire as claimed in claim 29, wherein the rubber mixture comprises from 30 to 100 phr of at least one carbon black with an STSA surface area to ASTM D6556 of from 10 to 60 m²/g and with a DBP number to ASTM D2414 of from 50 to 160 mL/100 g.

35. The pneumatic tire as claimed in claim 29, wherein the carbon black of the rubber mixture has an STSA surface area to ASTM D6556 of from 15 to 60 m²/g and a DEP number to ASTM D2414 of from 55 to 160 mL/100 g.

36. The pneumatic tire as claimed in claim 29, wherein the delaminated form of aluminohydrosilicate of the rubber mixture has a dioctahedral two-layer lattice.

37. The pneumatic tire as claimed in claim 29, wherein the dry-mix compound also comprises at least 40% of a di- or trioctahedral three-layer silicate from the group of the phyllosilicates, and/or at least 10% of an amorphous quartz or crystalline form of quartz.

38. The pneumatic tire as claimed in claim 29, wherein the delaminated form of aluminohydrosilicate of the rubber mixture has a CTAB surface area to ASTM D3765 of from 10 to 40 m²/g.

39. The pneumatic tire as claimed in claim 29, wherein the delaminated form of aluminohydrosilicate of the rubber mixture has a BET surface area to DIN66131 and DIN66132 of from 10 to 20 m²/g.

40. The pneumatic tire as claimed in claim 29, wherein the delaminated form of aluminohydrosilicate of the rubber mixture has a particle size $D_{50}$ of from 3 to 9 μm.

41. The pneumatic tire as claimed in claim 29, wherein the lamellarity index of the delaminated form of aluminohydrosilicate of the rubber mixture is from 2 to 15.

42. The pneumatic tire as claimed in claim 29, wherein the delaminated form of aluminohydrosilicate of the rubber mixture involves delaminated $Al_2[(OH)_4/Si_2O_5]$.

43. The pneumatic tire as claimed in claim 29, wherein the rubber mixture comprises from 5 to 20 phr of at least one mineral-oil plasticizer.

44. The pneumatic tire as claimed in claim 29, wherein the mineral-oil plasticizer of the rubber mixture has a viscosity of from 40 to 100 mm²/s at 100° C.

45. The pneumatic tire as claimed in claim 29, wherein the mineral-oil plasticizer of the rubber mixture has a glass transition temperature $T_g$ of from −40° C. to −30° C.

46. The pneumatic tire as claimed in claim 29, wherein the mineral-oil plasticizer of the rubber mixture has from 30 to 60% by weight content of aromatics.

47. The pneumatic tire as claimed in claim 29, wherein the quantitative proportion of the additional additives of the rubber mixture is from 3 to 150 phr.

48. The pneumatic tire as claimed in claim 47, wherein the quantitative proportion of the additional additives of the rubber mixture is from 3 to 100 phr.

49. The pneumatic tire as claimed in claim 48, wherein the quantitative proportion of the additional additives of the rubber mixture is from 5 to 80 phr.

\* \* \* \* \*

UNITED STATES PATENT AND TRADEMARK OFFICE
CERTIFICATE OF CORRECTION

PATENT NO. : 8,735,485 B2  
APPLICATION NO. : 13/074931  
DATED : May 27, 2014  
INVENTOR(S) : Müller-Wilke et al.

It is certified that error appears in the above-identified patent and that said Letters Patent is hereby corrected as shown below:

In the Specification

In Column 5:
Lines 60 to 64: delete "Lamellarity index= (particle size from laser diffraction) - (particle size from sedimentation) Particle Size from Sedimentation" and substitute $$\text{Lamellarity index} = \frac{(\text{particle size from laser diffraction}) - (\text{particle size from sedimentation})}{(\text{particle size from sedimentation})}$$

-- therefor.

In Column 9:
Line 60: delete "12 to 16" and substitute -- I2 to I6 -- therefor.

Signed and Sealed this  
Twelfth Day of August, 2014

Michelle K. Lee  
*Deputy Director of the United States Patent and Trademark Office*